United States Patent
Walser

(10) Patent No.: US 8,911,027 B2
(45) Date of Patent: Dec. 16, 2014

(54) MIXED BRAKING DEVICE WITH OPTIMIZED CONTROL

(75) Inventor: Daniel Walser, Cormerod (CH)

(73) Assignees: Michelin Recherche et Techniques S.A., Granges-Paccot (CH); Compagnie Generale des Etablissements Michelin, Clermont-Ferrano (FR)

( * ) Notice: Subject to any disclaimer, the term of this patent is extended or adjusted under 35 U.S.C. 154(b) by 227 days.

(21) Appl. No.: 13/498,283

(22) PCT Filed: Sep. 24, 2010

(86) PCT No.: PCT/FR2010/052015
§ 371 (c)(1),
(2), (4) Date: May 16, 2012

(87) PCT Pub. No.: WO2011/036422
PCT Pub. Date: Mar. 31, 2011

(65) Prior Publication Data
US 2012/0313426 A1   Dec. 13, 2012

(30) Foreign Application Priority Data
Sep. 25, 2009 (FR) .................................. 09 56647

(51) Int. Cl.
*B60T 13/58* (2006.01)
*B60T 7/06* (2006.01)
*B60T 7/04* (2006.01)

(52) U.S. Cl.
CPC . *B60T 7/042* (2013.01); *B60T 7/06* (2013.01); *B60T 13/586* (2013.01)
USPC ............... 303/3; 303/113.1; 74/512; 188/152

(58) Field of Classification Search
USPC ........ 303/3, 2, 10, 9, 22.1, 113.4, 155, 113.1; 74/512, 513, 514, 560; 188/151 A, 167, 188/355, 72.1, 152
See application file for complete search history.

(56) References Cited

U.S. PATENT DOCUMENTS

| 1,846,081 | A * | 2/1932 | Berry ............................ 188/357 |
| 8,479,608 | B2 * | 7/2013 | Schonlau et al. ............... 74/512 |
| 2008/0116740 | A1 * | 5/2008 | Yokoyama et al. ............. 303/20 |
| 2008/0236959 | A1 * | 10/2008 | Hashida et al. .............. 188/72.2 |

FOREIGN PATENT DOCUMENTS

GB     2449984       12/2008
WO   WO2008/092274   8/2008

* cited by examiner

*Primary Examiner* — Anna Momper
*Assistant Examiner* — San Aung
(74) *Attorney, Agent, or Firm* — Cozen O'Connor

(57) ABSTRACT

A braking device including a dissipative braking system, an electric braking system, and a first actuating device combined with the dissipative braking system. A second actuating device is combined with the electric braking system and a position sensor is combined with the second actuating device. This second actuating device is designed to drive the first actuating device after a non-zero travel from its inactive position, and the sensor is designed to drive the electric brake system according to the displacement travel of the second actuating device from its inactive position.

3 Claims, 2 Drawing Sheets

MIXED BRAKING DEVICE WITH OPTIMIZED CONTROL

RELATED APPLICATIONS

This is a U.S. national stage of application No. PCT/EP2010/063623, filed on Sep. 16, 2010. Priority is claimed based on the following application: France Application No.: 09/56647 filed on Sep. 25, 2009, the disclosure content of which is hereby incorporated by reference.

FIELD OF THE INVENTION

The invention relates generally to braking technologies.

More particularly, the invention relates to a braking device comprising dissipative braking means having a hydraulic control circuit, regenerative electric braking means, and at least a first actuating device which is selectively displaced from an inactive position against a first elastic force exerted by at least a first restoring element in order to activate the hydraulic control circuit of the dissipative braking means.

BACKGROUND OF THE INVENTION

Devices of this type are described, for example, in the patent documents US 2008/0173490 and FR 2 909 957.

The coexistence of a dissipative braking system and a regenerative electric braking system on the same vehicle, most often a hybrid vehicle, poses a number of problems, especially that of selecting the principles to be applied in coordinating and distributing the braking forces exerted by these two systems, and that of designing the means to be used in applying these principles.

The first patent document cited above, US 2008/0173490, describes the activation of the two systems by means of a conventional brake pedal while delaying the activation of the dissipative braking system by means of a transmission device using viscous friction.

This viscous friction device effects a partial transmission to the dissipative brake system of the force applied to the brake pedal, the proportion of force transmitted varying as a function of the actuation speed of the pedal.

The second patent document cited above, FR 2 909 957, also describes the activation of both systems by means of a conventional brake pedal, the electric brake system being, however, automatically controlled on the basis of data representing the actuation of said brake pedal.

Both the solutions known from the above-cited patents employ relatively complex means.

Furthermore, the reliability of the proposed solutions, both over time and in the event of failure of the electric braking system, is very difficult to ensure.

SUMMARY OF THE INVENTION

One object of the present invention is to provide a braking device comprising dissipative braking means and regenerative electric braking means which is not subject to at least one of the above-mentioned deficiencies.

To this end, the braking device according to an aspect of the invention, which otherwise conforms to the generic definition contained in the above preamble, is characterized essentially in that it additionally comprises a second actuating device, a second restoring element, and a position sensor, in that the second actuating device is displaced selectively from an inactive position against a second elastic force exerted by the second restoring element in order to activate the electric braking means, in that the inactive positions of the first and second actuating devices are separated by a non-zero distance, in that said first and second actuating devices have respective displacement trajectories such that the second actuating device mechanically drives the first actuating device after having reached a driving position separated from its inactive position by said non-zero distance, in that the second restoring force is smaller than the first restoring force, and in that the position sensor supplies an output signal which is used to activate the electric braking means and which varies as a function of the position of the second actuating device between its inactive position and its driving position.

As a result of this arrangement, the electric braking is exploited up to 100% of its capacity even before the dissipative braking is placed under load.

Furthermore, the braking device according to the invention can be controlled easily and intuitively by the driver, who spontaneously and naturally applies to the brake pedal the force corresponding to the deceleration he actually wishes to achieve.

In a first embodiment of the invention, it is provided that the first actuating device comprises a first pedal including a first lever pivoted to a support and a first pressure shoe fixed to this first lever, that the second actuating device comprises a second pedal including a second lever and a second pressure shoe fixed to this second lever, that the second lever is pivoted to the first lever and that the second shoe covers the first shoe at least in the driving position of the second actuating device.

In this case the sensor comprises, for example, a rotation sensor which is sensitive to angular movement of the second lever with respect to the first lever.

In addition, this device may include an electrical brake light switch which is mounted on one of the first and second levers and is sensitive to the relative rotational movement of these levers.

In a second embodiment of the invention, it is provided that the first actuating device comprises a piston mounted slidably in a master cylinder of the hydraulic control circuit of the dissipative braking means, said piston being returned to its inactive position by the first restoring element, that this piston has a contact face and a first stop spaced from the contact face, that the second actuating device comprises a push rod having a free end, a second stop, and a connected end, that this rod is selectively driven by its connected end by means of a brake pedal pivoted to a support, actuation of which brake pedal causes the free end of the push rod to slide relative to said first stop, that in the inactive position of the second actuating device the free end of the push rod is separated from the contact face of the piston by said non-zero distance, and that the second restoring element is arranged between the first and second stops.

In this case the sensor comprises, for example, a rotation sensor sensitive to angular displacement of the brake pedal with respect to the support.

However, this sensor may also comprise a linear position sensor supplying an output signal which varies with the position of the second stop in relation to the first stop.

In addition, it is expedient to provide that the free end of the push rod is at least partially spherical, the push rod then being guided in the master cylinder by its free end.

BRIEF DESCRIPTION OF THE DRAWINGS

Other characteristics and advantages of the invention will be clearly apparent from the following indicative and in no way limiting description, with reference to the appended drawings, in which.

DETAILED DESCRIPTION OF THE DRAWINGS

As previously stated, the invention relates to a braking device for a land vehicle, this device comprising two types 1 and 2 of brake systems and at least one actuating device, such as 11 (FIG. 1) or 12 (FIG. 2), which is designed to receive from the vehicle driver a braking command enabling the deceleration of said vehicle to be controlled.

The braking system 1 comprises energy-dissipating braking means which convert the kinetic energy of the vehicle into heat by, for example, using the friction of a brake pad on a brake disc or of a brake shoe on a brake drum.

The braking system 2 comprises electric energy-recovering braking means using in known fashion an electric machine which converts the kinetic energy of the vehicle into electrical energy which is generally used immediately to recharge onboard batteries.

Figure 1:
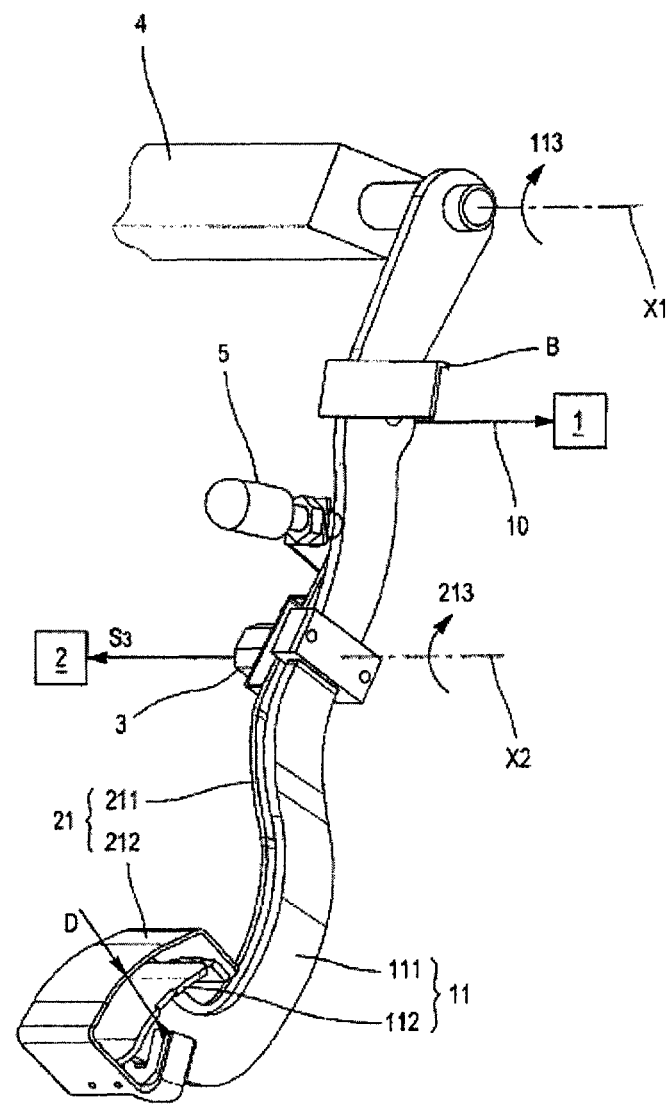
FIG. 1 is a schematic representation showing a first embodiment of the invention.
Figure 2:
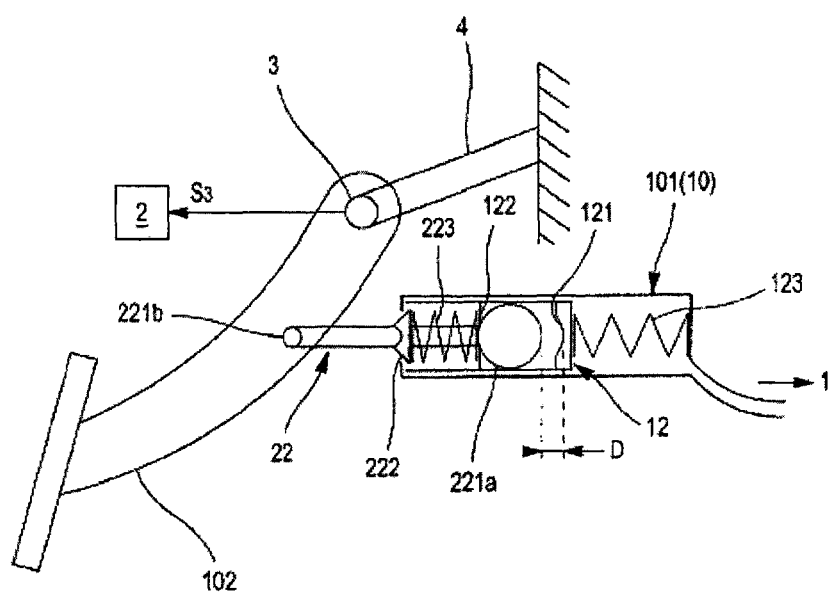
FIG. 2 is a schematic representation showing a second embodiment of the invention.

This braking device also includes a hydraulic control circuit 10 designed to transmit the braking command issued by the driver to the actuating device 11 or 12, this actuating device being displaced as desired by the driver from an inactive position against an elastic force exerted, in particular, by one or more restoring elements such as 113 (FIG. 1) and/or 123 (FIG. 2).

In reality, to simplify the representation, FIG. 1 does not directly illustrate the restoring element 113 as such, but only the elastic restoring torque exerted, in particular, by this element.

The device according to the invention also comprises a second actuating device such as 21 (FIG. 1) or 22 (FIG. 2), a second restoring element such as 213 (FIG. 1) or 223 (FIG. 2), and a position sensor 3.

In reality, again to simplify the representation, FIG. 1 does not directly illustrate the restoring element 213 as such, but only the elastic restoring torque exerted by this element.

The second actuating device 21 or 22 is designed to receive the braking command issued by the vehicle driver.

As a result of this command exerted by the driver against the elastic force developed by the second restoring element 213 or 223, the magnitude of which is less than the elastic restoring force exerted on the first actuating device 11 or 12, the second actuating device 21 or 22 is displaced from the inactive position it occupies by default and activates the electric braking means 2.

As shown in FIGS. 1 and 2, the inactive positions of the two actuating devices, 11 and 12 on the one hand and 12 and 22 on the other, are separated from one another by a non-zero distance D.

Furthermore, the actuating devices 11, 21 and 12, 22 have respective displacement trajectories such that the second actuating device 21 or 22 mechanically entrains the first actuating device 11 or 12 after having reached a driving position separated from its inactive position by the non-zero distance D.

The position sensor 3 is designed to supply an output signal S3 which is used to activate the electric braking means 2 and which represents the amplitude of the displacement of the second actuating device 21 or 22 from its inactive position.

The output signal S3 may be formed by an analogue signal or by a digital signal coded on several bits, the resolution depending primarily on the circuit.

In the first embodiment of the invention illustrated in FIG. 1, the first actuating device comprises a pedal 11.

This pedal 11 itself comprises a lever 111 pivoted to a support 4 about an axis X1, and a pressure shoe 112 fixed to a free end of this lever 111.

The restoring element designated by reference 113, which comprises a spring acting between the support 4 and the pedal 11, contributes to exerting on this pedal 11 a torque about the axis X1 which permanently pretensions said pedal 11 towards a stop B which is fixed with respect to the support 4.

The second actuating device also comprises a pedal 21, this second pedal including a lever 211 and a pressure shoe 212 fixed to a free end of this lever 211.

The lever 211 of the second pedal 21 is pivoted to the lever 111 of the first pedal 11 about an axis X2 carried by this lever 111.

The restoring element designated by reference 213, which comprises a spring acting between the levers 111 and 211 of the pedals 11 and 21, exerts on the lever 211 a torque about the axis X2 which permanently pretensions this lever 211 in the same direction as the restoring element 113 pretensions the pedal 11.

On the other hand, the restoring force exerted on the shoe 212 by the restoring torque which urges the lever 211 about the axis X2 is smaller than the restoring force exerted on the shoe 112 by the restoring torque urging the lever 111 of the first pedal 11 about the axis X1.

The shoe 212 of the second pedal 21 covers the shoe 112 of the first pedal 11 at least in the driving position of this second pedal 21, but possibly also in its inactive position, as illustrated in FIG. 1.

The sensor 3 is then formed substantially, for example, by a rotation sensor sensitive to angular displacement about the axis X2 of the lever 211 of the second pedal 21 with respect to the lever 111 of the first pedal 11.

As long as the braking command is expressed by a displacement of the pressure shoe 212 over a travel less than the distance D separating this shoe 212 from the pressure shoe 112 of the pedal 11 at rest, only the electric braking system 2 is activated, producing a braking torque defined by the value of the output signal S3 of the sensor 3 and increasing with the actuation travel of the pressure shoe 212.

On the other hand, when the braking command is such that the pressure shoe 212 of the pedal 21 reaches the pressure shoe 112 of the pedal 11 and displaces this pedal 11 against the restoring force exerted by the restoring element 113, pressure in the hydraulic control circuit 10 increases and causes activation of the dissipative brake system 1 in addition.

As shown in FIG. 1, the device according to the first embodiment of the invention may also include an electrical brake light switch 5, which is mounted, for example, on the lever 211, is sensitive to the relative rotary movement of said lever 211 with respect to the lever 111, and also performs the function of a stop limiting the degree of rotary movement of said levers 111 and 211 with respect to one another about the axis X2 under the effect of the torque exerted by the restoring element 213.

In the second embodiment of the invention, shown in FIG. 2, the first actuating element comprises a piston 12 having a contact face 121, and a stop 122 spaced from said contact face 121.

This piston 12, which is mounted slidably in a master cylinder 101 forming part of the hydraulic control circuit 10 of the dissipative braking system 1, is returned to its inactive position by the restoring element 123, formed by a prestressed helical spring.

The second actuating element comprises a push rod 22 having a free end 221a, a second stop 222 and a connected end 221b.

The braking system 1 further comprises a pedal 102 which is pivoted to a support 4, is designed to be operated by the vehicle driver and to which the connected end 221b of the push rod 22 is articulated.

The second restoring element comprises a helical spring 223 arranged between the stop 222 of the push rod 22 and the stop 122 of the piston 12, the restoring element 223 exerting an elastic restoring force smaller than the elastic restoring force exerted, in particular, by the first restoring element 123 on the piston 12.

Under these conditions, operation of the brake pedal 102 has the effect of driving the push rod 22, the free end 221a of which then slides with respect to the stop 122 and approaches the contact face 121.

In this case, too, the sensor 3 may be formed substantially by a rotation sensor which is sensitive to angular displacement of the brake pedal 102 with respect to the support 4.

Nevertheless, the sensor 3 may also be formed by a linear position sensor the output signal S3 of which varies with the position of the second stop 222 with respect to the first stop 122, that is, as a function of the length of the helical spring 223.

As shown in FIG. 2, the free end 221a of the push rod 22 has at least partially the shape of a sphere, so that the push rod 22 can be guided by its free end 221a in the master cylinder 101.

As long as the braking command is expressed by sliding of the free end 221a of the push rod 22 over a travel shorter than the distance D which separates said free end 221a from the contact face 121 of the piston 12 at rest, only the electric brake system 2 is activated, producing a braking torque defined by the value of the output signal of the sensor 3 and increasing with the actuation travel of the push rod 22.

On the other hand, when the braking command is such that the free end 221a of the push rod 22 reaches the contact face 121 of the piston 12 and displaces this piston against the restoring force exerted by the spring 123, the pressure in the hydraulic control circuit 10 increases and causes in addition the activation of the dissipative brake system 1.

The invention claimed is:

1. A braking device comprising dissipative braking means having a hydraulic control circuit, regenerative electric braking means, and at least a first actuating device which is displaced selectively from an inactive position against a first elastic force exerted by at least a first restoring element in order to activate the hydraulic control circuit of the dissipative braking means, a second actuating device, a second restoring element, and a position sensor,
wherein the second actuating device is displaced selectively from an inactive position against a second elastic force exerted by the second restoring element in order to activate the electric braking means,
wherein the inactive positions of the first and second actuating devices are separated by a non-zero distance,
wherein said first and second actuating devices have respective displacement trajectories such that the second actuating device mechanically drives the first actuating device after having reached a driving position separated from its inactive position by said non-zero distance,
wherein the second restoring force is smaller than the first restoring force,
wherein the position sensor supplies an output signal which is used to activate the electric braking means and which varies as a function of the position of the second actuating device between its inactive position and its driving position,
wherein the first actuating device comprises a first pedal including a first lever pivoted to a support and a first pressure shoe fixed to this first lever,
wherein the second actuating device comprises a second pedal including a second lever and a second pressure shoe fixed to this second lever,
wherein the second lever is pivoted to the first lever, and
wherein the second shoe covers the first shoe at least in the driving position of the second actuating device.

2. The device according to claim 1, wherein said sensor comprises a rotation sensor which is sensitive to the angular displacement of the second lever with respect to the first lever.

3. The device according to claim 1, further comprising an electrical brake light switch which is mounted on one of the first and second levers and is sensitive to the relative rotational movement of these levers.

* * * * *